US007802261B2

(12) United States Patent
Cha et al.

(10) Patent No.: US 7,802,261 B2
(45) Date of Patent: Sep. 21, 2010

(54) METHOD AND SYSTEM FOR DISPLAYING CONTENT USING MESSAGE COMMUNICATIONS

(75) Inventors: Soon-back Cha, Suwon-si (KR); Jong-hak Ahn, Suwon-si (KR); Eun-hee Rhim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1115 days.

(21) Appl. No.: 11/203,312

(22) Filed: Aug. 15, 2005

(65) Prior Publication Data

US 2006/0036672 A1 Feb. 16, 2006

(30) Foreign Application Priority Data

Aug. 14, 2004 (KR) ...................... 10-2004-0064103

(51) Int. Cl.
*G06F 3/00* (2006.01)
*G06F 13/00* (2006.01)
*G06F 15/16* (2006.01)
(52) U.S. Cl. ....................... 719/313; 709/201; 709/202; 709/203; 709/208; 709/217; 709/218; 709/219
(58) Field of Classification Search ................. 719/313; 709/201–203, 208, 217–219; 725/86, 105; 718/102–103
See application file for complete search history.

(56) References Cited

U.S. PATENT DOCUMENTS

| 6,442,573 | B1 | 8/2002 | Schiller et al. |
| 6,564,259 | B1 | 5/2003 | Baber et al. |
| 7,184,848 | B2* | 2/2007 | Krzyzanowski et al. ....... 700/90 |
| 2002/0083201 | A1* | 6/2002 | Iyengar et al. .............. 709/246 |
| 2002/0107985 | A1* | 8/2002 | Hwang et al. ............... 709/246 |
| 2004/0261114 | A1* | 12/2004 | Addington et al. .......... 725/106 |
| 2005/0177624 | A1* | 8/2005 | Oswald et al. .............. 709/219 |

FOREIGN PATENT DOCUMENTS

| CN | 2399797 Y | 10/2000 |
| CN | 1355492 A | 6/2002 |

(Continued)

OTHER PUBLICATIONS

"The Authoritative Dictionary of IEEE Standards Terms" 2000, IEEE Press, Seventh Edition, p. 44.*

(Continued)

*Primary Examiner*—Qing-Yuan Wu
(74) *Attorney, Agent, or Firm*—Sughrue Mion, PLLC

(57) ABSTRACT

Disclosed is a content displaying system and method using message communications. An embodiment of the system includes a server to store a large number of content therein, a device interface module to receive a message to display content or to receive content from the server, a device agent module for creating a message requesting content included in a list of content from the server, where the device interface module has received the message containing the content list and transmits it to the server through the device interface module, and for receiving the requested content from the server through the device interface module, a content processing module to convert the received content into a suitable output format, and a display apparatus including a display module to output the converted content.

16 Claims, 9 Drawing Sheets

FOREIGN PATENT DOCUMENTS

| | | |
|---|---|---|
| CN | 2518177 Y | 10/2002 |
| EP | 1 387 281 A1 | 2/2004 |
| EP | 1 528 466 A2 | 5/2005 |
| JP | 2000-259532 A | 9/2000 |
| JP | 2002-202927 A | 7/2002 |
| KR | 2000-0033213 A | 6/2000 |
| KR | 10-0374392 B1 | 2/2003 |
| WO | WO 01/20468 A1 | 3/2001 |

OTHER PUBLICATIONS

"The Authoritative Dictionary of IEEE Standards Terms" 2000, IEEE Press, Seventh Edition, pp. 210 and 1031.*

* cited by examiner

METHOD AND SYSTEM FOR DISPLAYING CONTENT USING MESSAGE COMMUNICATIONS

CROSS-REFERENCE TO RELATED APPLICATIONS

This application claims priority from Korean Patent Application No. 10-2004-0064103 filed on Aug. 14, 2004 in the Korean Intellectual Property Office, the disclosure of which is incorporated herein by reference in its entirety.

BACKGROUND OF THE INVENTION

1. Field of the Invention

Apparatuses and methods consistent with the present invention relate to services to display content. More particularly, the present invention relates to a system and a method for more efficiently supplying content and remotely controlling and monitoring multiple display apparatuses by allowing a server and the multiple display apparatuses interconnected by a network to perform predetermined message communication.

2. Description of the Related Art

FIG. 1 schematically illustrates a conventional system for supplying a content display service.

The conventional system 100 comprises display apparatuses 110, 130 and 150 and servers 120, 140 and 160 respectively connected to each of the display apparatuses to thereby supply content to the display apparatuses. The content comprises multimedia data (e.g., music, images, moving pictures) as well as other data in various text formats.

The respective servers 120, 140 and 160 have a variety of software programs installed therein and/or independent hardware mounted thereon, to thereby convert the content stored in the servers into a format suitable for output. The format of the content selected by a server manager is converted by a software program or hardware, and the content is output by the display apparatus.

A display apparatus may comprise a function to receive and output content selected by a user and then transmitted from the server. In this case, the display apparatus functions as a client. A method of providing such a service for displaying content between a client and a server is illustrated in FIG. 2.

While a server is in operation, a client connects to the server using the address and port information of the server S210, and requests a service from the server S220. Then, the server searches for the requested service, and supplies the service to the client S230.

According to the conventional system, as illustrated in FIG. 1, each of the display apparatuses needs a separate server having a function to convert a format of the content adaptively for its own. Therefore, a server manager has to select any content to be outputted directly from the display apparatus, causing inconvenience to him/her. In the client-server configuration illustrated in FIG. 2, it is difficult for the server to control a client display apparatus and to watch for changes in the physical states of the display apparatus. A server may be allowed to control the display apparatus by means of a home network standard such as universal plug-and-play (UPnP). In this case, the UPnP environment can be embodied using the HyperText Markup Language (HTML), and thus, a server and a display apparatus require an HTML browser and a parser to interpret the concerned message set. In addition, to perform the UPnP protocol, hardware or software equivalent in performance to an HTTP server is required. In this case, however, the hardware and software are effective only when the remote control commands are defined in UPnP, and many restrictions are imposed on both the extension of remote control commands and the monitoring of the display apparatus. Even when executing a simple remote control command, an HTTP server to perform the UPnP protocol and an HTML parser are required.

Under the circumstances, to solve difficulties in the conventional art, a message communication method is required for efficiently supplying content to a display apparatus and remotely controlling and monitoring the display apparatus.

SUMMARY OF THE INVENTION

The present invention has been conceived to solve the problems described above.

An aspect of the present invention is to automatically output content to multiple display apparatuses each having a message communication function, through a single server.

Another aspect of the present invention is to remotely control multiple display apparatuses each having a message communication function from a single server and watch any change caused in physical state of the display apparatus.

The present invention will not be limited to the aspects described above. Other aspects not described herein will be more definitely comprehended by those in the art from the following detailed description.

According to an aspect of the present invention, there is provided a system for displaying content using message communication comprising a server to store a large number of content therein, a device interface module to receive a message to display content or to receive content from the server, a device agent module for creating a message requesting content included in a list of content from the server, where the device interface module has received the message containing the content list and transmits it to the server through the device interface module, and for receiving the requested content from the server through the device interface module, a content processing module to convert the received content into a suitable output format, and a display apparatus including a display module to output the converted content.

According to another aspect of the present invention, there is provided a system for displaying content using message communication comprising a server to store a large amount of content therein, a device agent module to create a first message requesting a list of content stored in the server and a second message requesting content arbitrarily selected from the content list received from the server, a device interface module to transmit the first message or the second message to the server, and to receive selected content from the server, a content processing module to convert the received content into a suitable output format, and a display apparatus including a display module to output the converted content.

According to a further aspect of the present invention, there is provided a method for displaying content using message communication comprising receiving a message from a server storing a large amount of content therein in order to display it, creating a message to request content included in a list of content and transmitting it to the server, where the received message contains the content list, receiving the requested content from the server, and converting the received content into a suitable output format.

According to a still further aspect of the present invention, there is provided a method for displaying content using message communication comprising creating a first message to request a list of content stored in a server storing a large amount of content therein, and transmitting it to the server, receiving the list from the server, creating a second message to request content arbitrarily selected from the received list and transmitting it to the server, receiving the selected content from the server, and converting the received content into a suitable output format.

According to another aspect of the present invention, there is provided an apparatus for displaying content comprising a device interface module for receiving a message to display or receive content from a server storing a large amount of content therein, a device agent module for creating a message requesting content included in a list of content from the server, where the device interface module has received the message containing the content list, and transmitting the message to the server through the device interface module, and receiving the requested content from the server through the device interface module, a content processing module to convert the received content into a suitable output format, and a display apparatus including a display module to output the converted content.

According to a further aspect of the present invention, there is provided an apparatus for displaying content, comprising a device agent module to create a first message requesting a list of content stored in a server storing a large amount of content therein and a second message requesting content arbitrarily selected from the content list received from the server, a device interface module to transmit the created first message or second message to the server, and to receive selected content from the server, a content processing module to convert the received content into a suitable output format, and a display apparatus including a display module to output the converted content.

According to another aspect of the present invention, there is provided a server for displaying content comprising a storage module storing a large amount of content therein, a server agent module to create a message containing information on a list of content stored in the server, a server interface module to transmit the message to a display apparatus, wherein the server agent module extracts the requested content from the storage module at the request of the display apparatus, and transmits the extracted content to the display apparatus through the server interface module.

According to a further aspect of the present invention, there is provided a server for displaying content comprising a storage module storing a large amount of content therein, a server interface module to receive a first message to request information on a list of content stored in the server from the display apparatus or a second message to request the content selected from the list information, and a server agent module to extract the selected content from the storage module when the server interface module has received the second message, and to transmit the extracted content to the display apparatus through the server interface module.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EXEMPLARY EMBODIMENTS OF THE INVENTION

Figure 1:
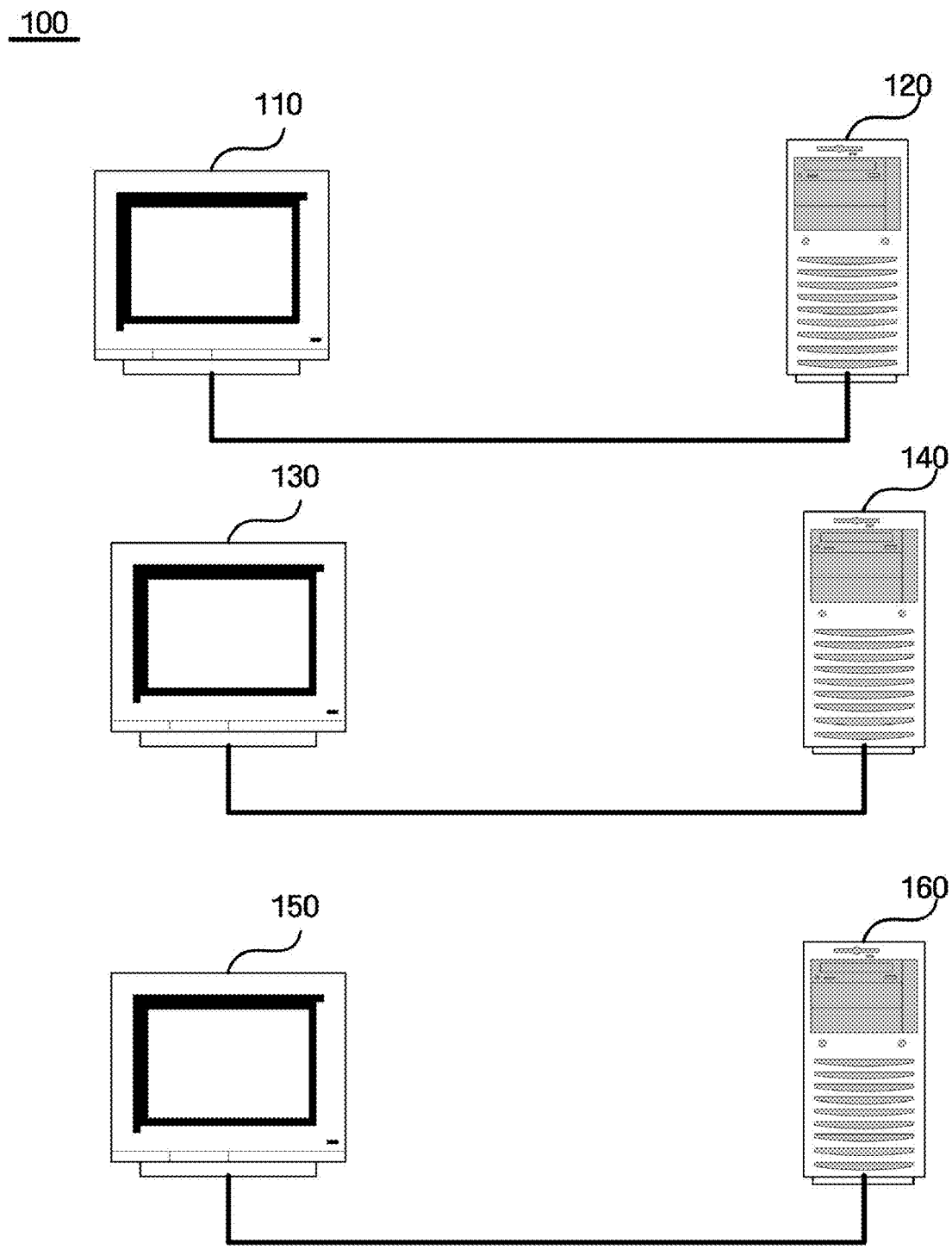
FIG. 1 schematically illustrates a conventional system for supplying a service to display.
Figure 2:
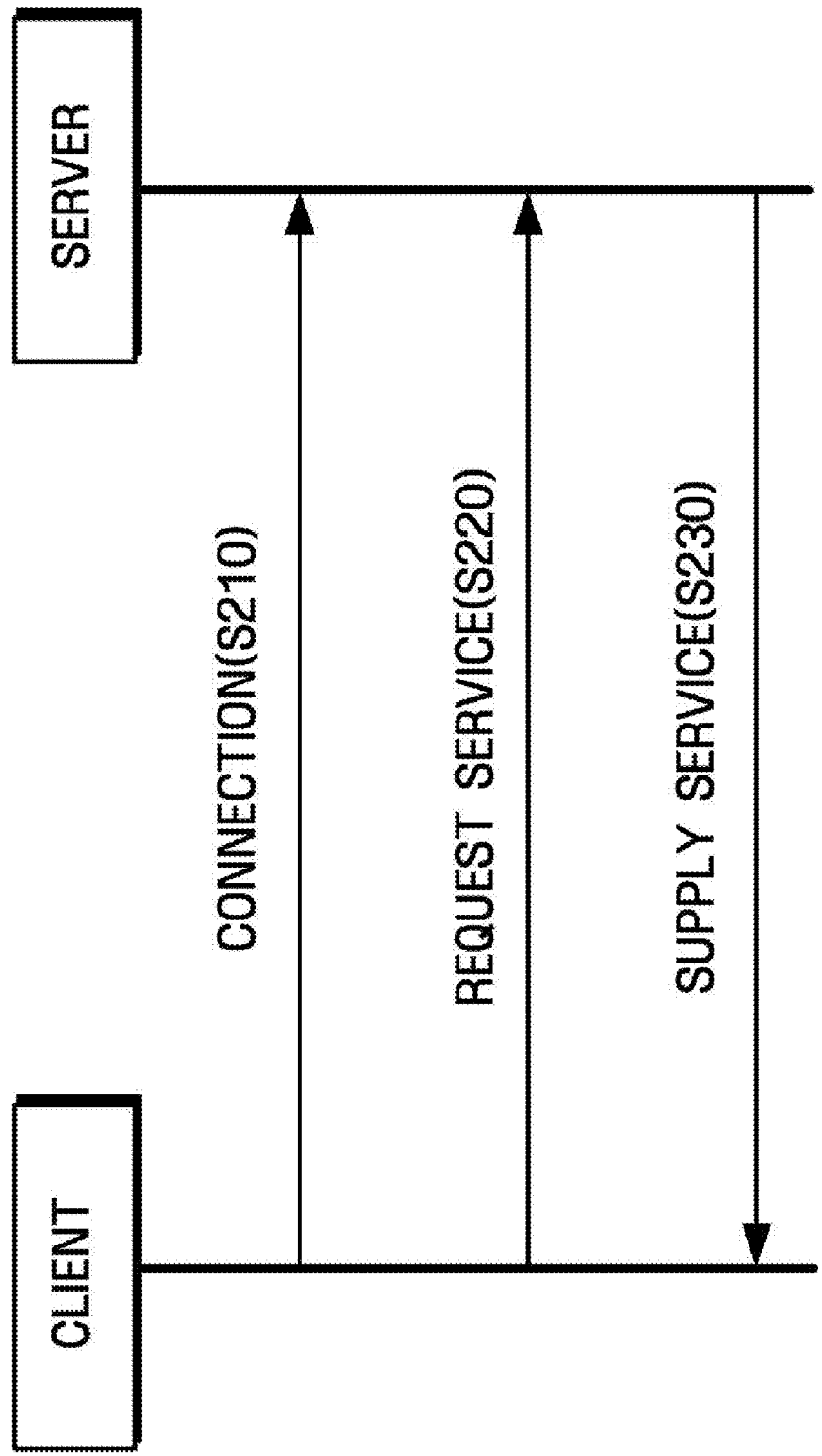
FIG. 2 illustrates a method of supplying the service between a client and a sever according to the conventional system.

Subject matter of exemplary embodiments of the present invention will be covered by the detailed description and drawings.

Advantages and features of the present invention and methods of accomplishing the same may be understood more readily by reference to the following detailed description of the exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

The content displaying system and method according to exemplary embodiments of the present invention will be described in the following, referring to block diagrams and flow charts illustrated in the accompanying drawings. Flow charts and combinations of each block of the flow chart diagrams can be executed by computer program instructions. Since these computer program instructions may be installed on general purpose computers, special purpose computers or other programmable data processing equipment, any tool can be constructed so that the instructions performed through computers or processors of other programmable data processing equipment can generate means to perform the functions described in the flow charts or blocks. These computer program instructions may be stored in computer usable or computer readable memories to implement the functions. The instructions stored in the computer usable or computer readable memories may be manufactured as products including instruction means to perform functions described in the flow charts and blocks. The computer program instructions may be installed on computers or other programmable data processing equipment; the instructions creating processes performed by computers by executing a series of operations on computers or other programmable data processing equipment, and operating the computers or other programmable data processing equipment may also supply operations to perform the functions described in the flow charts or blocks.

Figure 3:
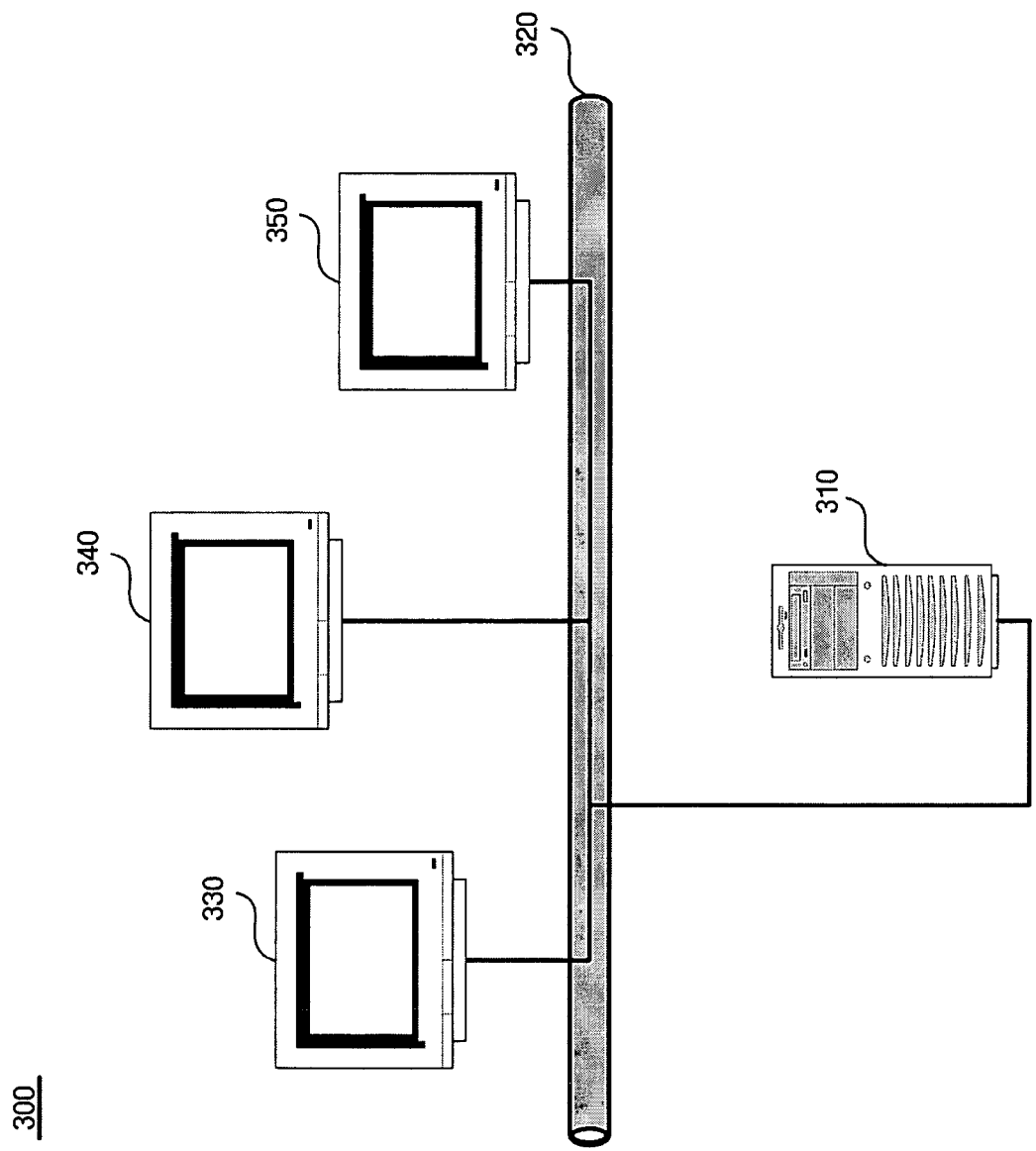
FIG. 3 schematically illustrates a system to supply a content displaying service according to an exemplary embodiment of the present invention.

FIG. 3 schematically illustrates a system for supplying a content displaying service according to an exemplary embodiment of the present invention. The system 300 comprises a server 310 connected to plural display apparatuses 330, 340 and 350, which receive content from the server 310 and output the content through a transmitting medium 320. The display apparatus is preferably, but not necessarily, a large-sized display such as a television set, a monitor, or an electric signboard.

Unlike the conventional system, the server 310 supplies content stored therein to a display apparatus according to a predetermined schedule, and the display apparatus converts the received content to a suitable format and outputs it. Accordingly, the display apparatuses comprise hardware or software that can convert the content to various formats.

In addition, the server 310 can remotely control the display apparatuses 330, 340 and 350, and monitor changes in state of the same.

Information may be transmitted between the server 310 and the display apparatuses 330, 340 and 350, using message communication, which will be described later.

Figure 4:
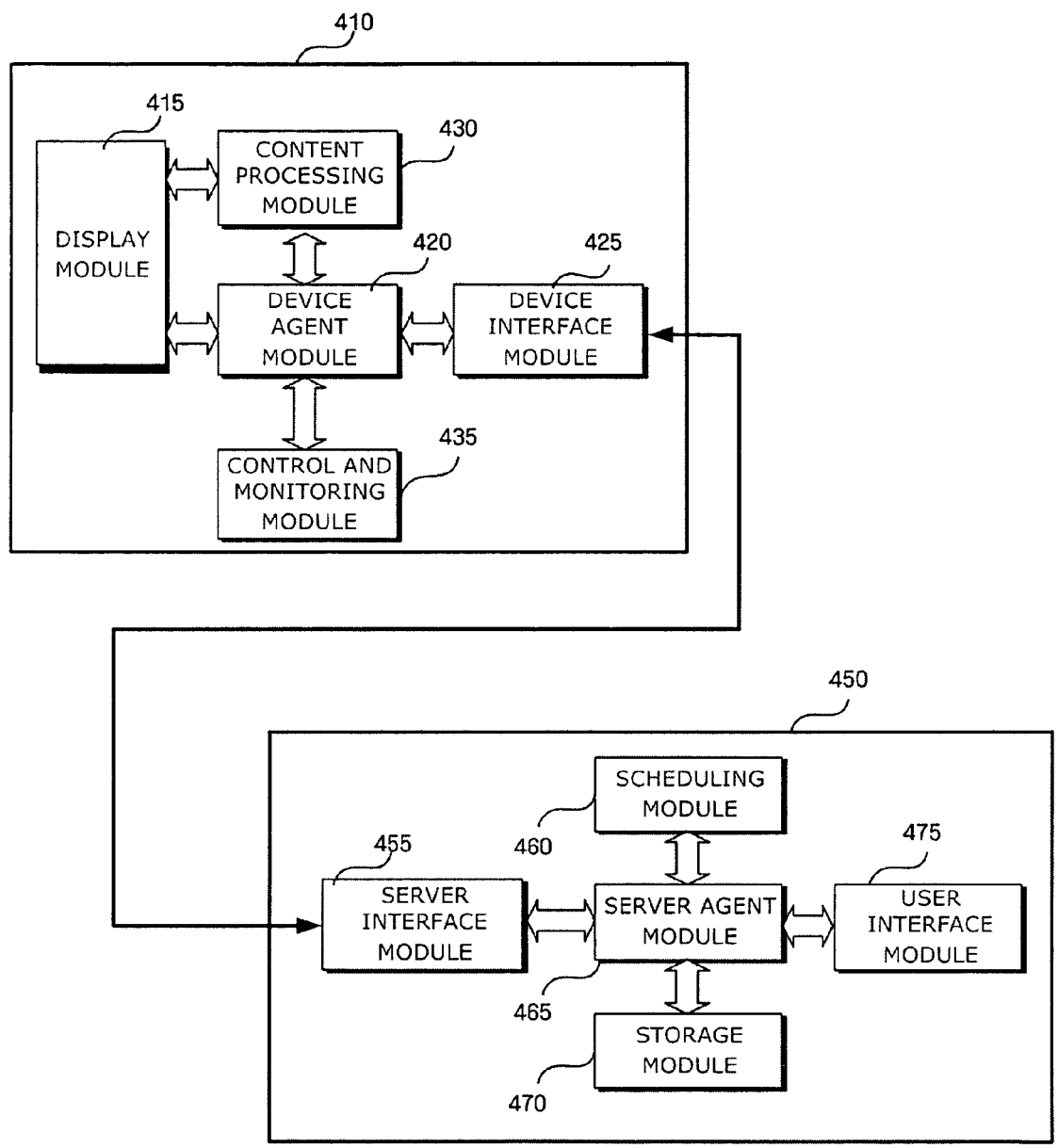
FIG. 4 illustrates respective structures of a display apparatus and a server to supply the content displaying service according to an exemplary embodiment of the present invention.

FIG. 4 illustrates respective structures of a display apparatus and a server that provide a content displaying service according to an exemplary embodiment of the present invention.

The display apparatus 410 comprises a display module 415, a device agent module 420, a device interface module 425, a content processing module 430 and a control and monitoring module 435.

The display module 415 displays content received from the server 450, and provides a means to allow a user to request specific content stored in the server 450.

The device interface module 425 automatically senses other display apparatuses and a server connected via a network, extracts information about the display apparatuses and the server, and performs message communication with the display apparatuses or the server 450.

The content processing module 430 converts the content received from the server 450 to the output format of the display apparatus 410, and transmits the converted content to the display module 415.

When the display apparatus 410 receives a control command from the server 450, the control and monitoring module 435 performs an operation corresponding to the received message, or performs a function to sense any change in the state of the display apparatus 410.

The device agent module 420 interprets messages received from the device interface module 425, and performs the operations detailed in the messages. Further, the device agent module 420 coordinates the display module 415, the control and monitoring module 435, and the content processing module 430 to ensure smooth operations among them.

The server 450 comprises a server interface module 455, a scheduling module 460, a server agent module 465, a storage module 470, and a user interface module 475.

The server interface module 455 automatically senses multiple display apparatuses connected via a network, extracts information about the display apparatuses, and performs message communication with the display apparatuses.

Music, images, videos, or text files in various formats are stored in the storage module 470.

The user interface module 475 provides a means to allow a user to search content stored in the storage module 470 based on a keyword or an index, and a means to allow the user to manage a schedule about the delivery of content. In addition, the user interface module 475 provides a means to allow the server manager to remotely control plural display apparatuses and also a means to display information on any changes in state of the plural display apparatuses.

The scheduling module 460 transmits specific content to designated display apparatuses at fixed times according to the schedule.

The server agent module 465 interprets the messages transmitted from the server interface module 455, and conducts operations accordingly. In addition, the server agent module 465 coordinates the user interface module 475, the scheduling module 460 and the storage module 470 to ensure smooth operations among them.

The term 'module', as used herein, means, but is not limited to, a software or hardware component, such as a Field Programmable Gate Array (FPGA) or an Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

The operations between modules will be described in detail in the following. For the sake of convenience, an operation for content display and an operation for remote control and monitoring will be described.

Content Displaying Service

Mutual Recognition Between a Displaying Apparatus and a Server

The server 450 and the display apparatus 410 are connected to form a single network group through the server interface module 455 and the device interface module 425, respectively. At this time, the server 450 may be connected to a plurality of display apparatuses, but it will be assumed, for the sake of convenience, that the server 450 is connected to a single display apparatus. The internal blocks of other display apparatuses are assumed to be identical to those of the display apparatus 410 illustrated in FIG. 4.

The server interface module 455 senses whether power is supplied to the display apparatus 410 and whether the display apparatus 410 is in an operable state. The device interface module 425 senses whether power is supplied to the server 450 and whether the server 450 is in an operable state. For example, if the server interface module 455 senses the display apparatus 410 and transmits a message to the server agent module 465, the server agent module 465 provides the user with information about the state of the display apparatus 410 through the user interface module 475. As such, the user can ascertain the states of the respective display apparatuses using one server 450, without having to consult multiple servers.

Scheduling

At first, the user searches for content stored in the storage module 470 using a keyword or an index by means of the user interface module 475, so as to display the content on the display apparatus 410. The user determines the time to display the content on the display apparatus 410 and inputs it in the user interface module 475.

Scheduling information, which includes information about the searched content, the display apparatus to display the searched content thereon, and the time to display the searched content, is managed by the scheduling module 460. Thus, as the time to display the content approaches, the scheduling module 460 transmits the scheduling information to the server agent module 465. Then, the server agent module 465 extracts the target content from the storage module 470, and transmits it to the concerned display apparatus through the server interface module 455.

Content Outputting

When the display apparatus 410 has received data from the server 450 through the device interface module 425, the device agent module 420 first determines whether the received data relates to content output or to control of the display apparatus 410.

When the received data relates to content output, the device agent module 420 transmits the received data to the content processing module 430.

The content processing module 430 converts the data received from the device agent module 420 into a format suitable for output by the display apparatus 410, and drives an application program to output the converted content to the user through the display module 415.

The user of the display apparatus 410 may request content from the server 450 through the display module 415. In this case, the display module 415 has a means to receive the content information inputted by the user. At this time, the display apparatus 410 may receive a list of contents stored in the storage module 470 of the server 450 in advance from the server 450, and upon receiving a request from the user, it may provide the list to the user through the display module 415. As another exemplary embodiment, the display apparatus 410 may request the server 450 to provide the list of contents stored in the storage module 470 only upon receiving the user's request.

EXAMPLES

The exemplary embodiments of the present invention may be applied to various fields. Several examples will be described in the following.

Cyber Galleries

The server 450 stores high quality images of works of art in the storage module 470. Display apparatuses, which are connected to the server 450 through a network, are positioned in galleries or showrooms to exhibit the works.

The server manager determines a schedule for displaying the images on the respective display apparatuses, through the user interface module 475, and this schedule is registered in the scheduling module 460. When the time approaches, the scheduling module 460 transmits the schedule to the server agent module 465, and the server agent module 465 extracts the image data designated in the schedule from the storage module 470, and transmits the extracted image data to the display apparatus designated in the schedule through the server interface module 455, so that the user can view the images.

Airport Information Service

In the Airport Information Service the server 450 stores content such as an airport guide and flight information, advertisements, and video/audio for entertainment in the storage module 470. The display apparatuses are installed where they are required in an airport, and they are connected to the server 450 through a network.

The scheduling module 460 of the server 450 manages the order of the content to be supplied to the respective display apparatuses.

When the designated time is reached, the server 450 transmits the concerned content to the designated display apparatuses, and the display apparatuses convert the received content to a suitable format and outputs it on the screen.

Information Presentation Service

In this application the server 450 stores a guide and introduction materials for a presentation in the storage module 470. The display apparatuses are installed where they are required in publicly accessible spaces and they are connected to the server 450 through a network.

The scheduling module 460 of the server 450 manages the order and the content of the presentation to be supplied to the respective display apparatuses.

When the time designated in the schedule is reached, the server 450 transmits the concerned content to the designated display apparatuses, and the display apparatuses convert the received content to a suitable format and output it on the screen.

Remote Control and Monitoring

The server 450 may remotely control the display apparatus 410 according to the state of the display apparatus 410. For this, the server 450 and the display apparatus 410 both have remote control message sets. Also, the display apparatus 410 contains a control and monitoring module 435.

For example, when a server manager desires to power on/off the display apparatus 410 or control output states thereof, such as volume or contrast, the server manager inputs a control command through the user interface module 475. At this time, the user interface module 475 provides a user with a user interface to control the display apparatus.

In addition, the server 450 may remotely command operations such as stop, pause, forward, back, with respect to current content being output by the display apparatus.

Meanwhile, the control and monitoring module 435 of the display apparatus 410 senses whether an event has been generated. When it senses an event, the control and monitoring module 435 transmits information on changes in the state of the display apparatus 410 to the device agent module 420. The device agent module 420 transfers the information to the server 450 through the device interface module 425. As a result, the server 450 can monitor the state of the display apparatus 410 remotely.

Remote control and monitoring of the display apparatus 410 by the server 450 will be described later in more detail.

Message communication between the display apparatus 410 and the server 450 will be described hereinafter. For the sake of convenience, the display apparatus 410 is referred to as a client, and the block diagrams depicted in FIG. 4 will be used in describing the present embodiment. At this time, creation and interpretation of messages is conducted by the server agent module 465 in the server 450, and by the device agent module 420 in the client 410.

Roughly, the message communication protocol according to the present embodiment covers: (i) message communication to register a client as a service subscriber in the server and to begin the service (see FIG. 5); ii) message communication to implement a Pull mode from the server (see FIG. 6); iii) message communication to implement a Push mode from the server to the client (see FIG. 7); iv) message communication for remote control of the client by the server (see FIG. 8); and v) message communication for service termination by the client (see FIGS. 9A and 9B).

As an example of the Pull mode of service, when there is a server to supply music, a user can request and receive a desired song from the server.

As an example of the Push mode of service, when monitors supporting network functions are distributed in the waiting rooms of a train station or a bus terminal, the server supplies services to transmit departure and arrival times of buses or trains, public notifications, movies, music or the like to each monitor.

Figure 5:
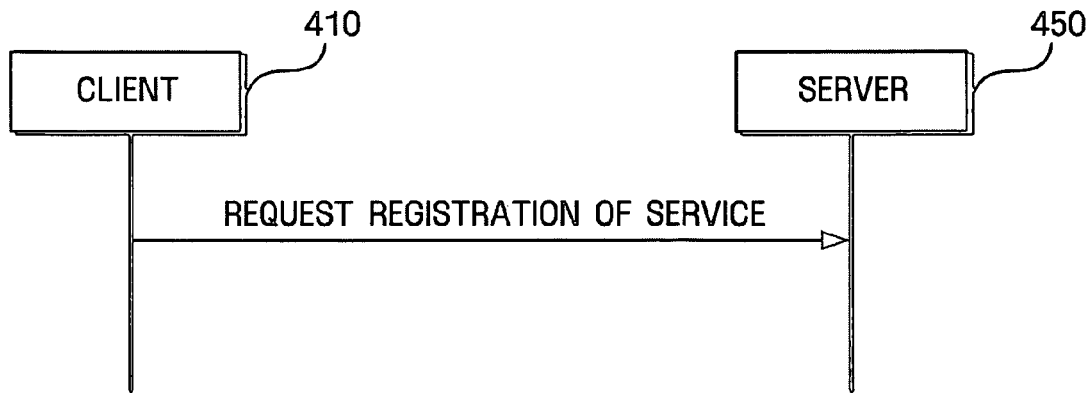
FIG. 5 illustrates registering a service of the client according to an exemplary embodiment of the present invention.

FIG. 5 illustrates registration by the client of services according to an exemplary embodiment of the present invention. To allow the client 410 to use services supplied by the server 450, information on the client 410 is registered with the server 450.

At this time, a packet for this service registration has a payload containing a MAC address, a Service Type, a Group Name, and a Client Name.

The 'MAC address' refers to an identification allocated to each network card included in the device interface module 425, which is also used as an identifier to distinguish individual clients. In remote control, the MAC address can also be used by the server 450 to turn on the client 410.

'Service type' is an identifier to distinguish services from different servers.

'Group name' is the name of a group, which is used to manage clients in groups.

'Client name' is an alias of the client, which is used to distinguish individual clients.

As depicted in FIG. 5, when the client 410 requests the server 450 to register a service using a service registration message, the server agent module 465 ascertains the service type and the group name contained in the service registration message. If the service type is consistent with a service type supported by the server 450, and if the group name belongs to a group managed by the server 450, the server agent module 465 stores information of the client 410 that requested the service registration in the storage module 470. The server 450 may be set to provide the service only to a specific group or to a client belonging to all the groups. The server 450 may manage a list of registered clients by group, or it may supply services differentiated by group.

Figure 6:
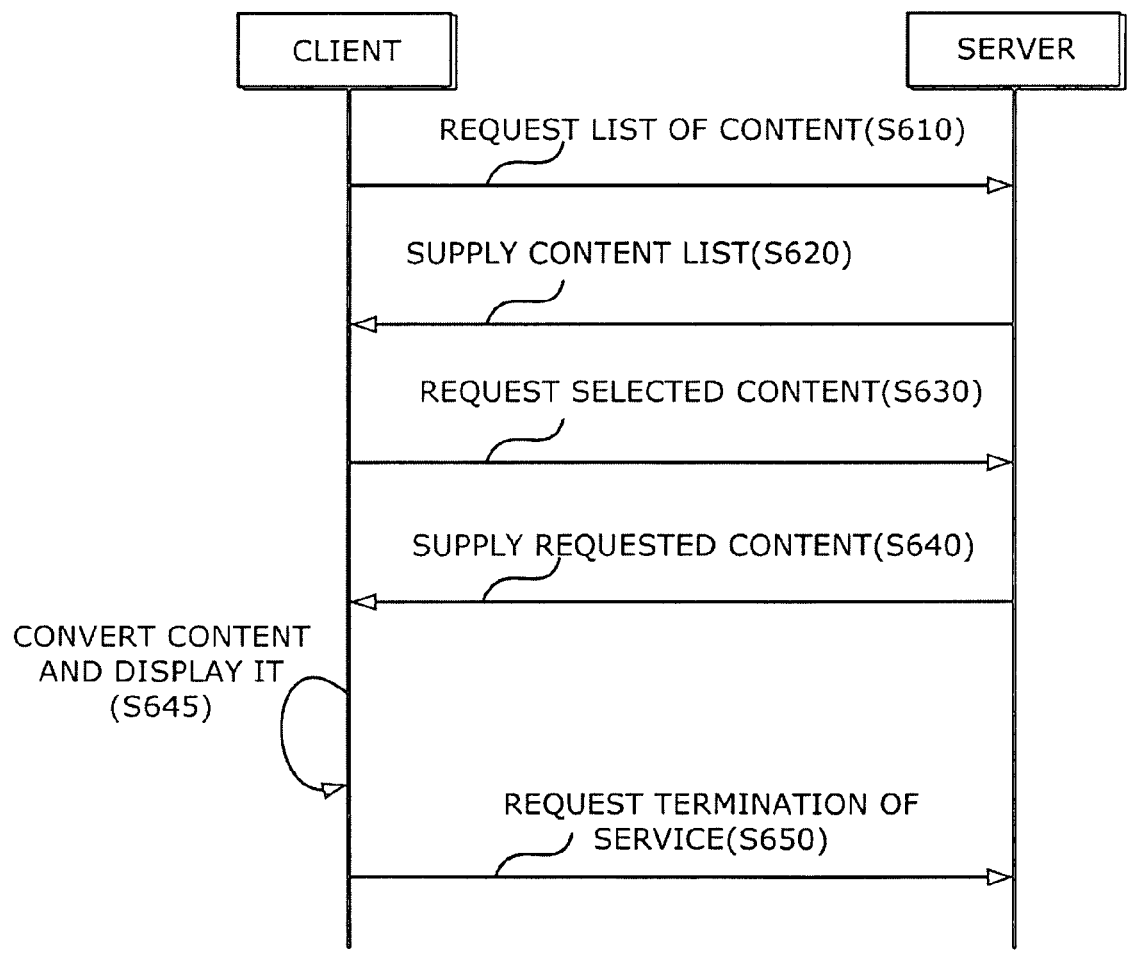
FIG. 6 illustrates a Pull mode service performed according to an exemplary embodiment of the present invention.

FIG. 6 illustrates a Pull mode of service according to an exemplary embodiment of the present invention. The Pull mode of service is performed when content stored in the server 450 is desired by the client 410.

Packets to perform the Pull mode of service:

Packet payload for requesting Pull mode content list={Service Type, Group Name, Client Name, Media Type, List Sorting Information, List Requesting Information};

Packet payload for Pull mode content list={Service Type, Server Name, Media Type, Content List Information, Server Service Networking Information};

Packet payload for requesting Pull mode content={Service Type, Group Name, Client Name, Content Information}; and Packet payload for Pull mode content termination={Service Type, Group Name, Client Name, Media Type}.

'Media type' indicates the kind of media; for example, movies, music, photographs or text files.

'List sorting information' is a parameter for sorting, such as name, date, size of file, genre of a file, and others.

'List requesting information' indicates number of lists per page, positions of the pages, and others.

'Content list information' refers to a list of content information, that is, a list of content of a specific media type.

'Server service networking information' refers to network access information for providing the service of the server. For example, the 'Server service networking information' may contain an IP address or a port number. When multicasting is requested, an IP address or a port number for multicasting may be included in the 'Server service networking information'.

'Content information' refers to information about content, such as file name, file length, date of creation, genre, playing time, and thumbnail of the content.

As illustrated in FIG. 6, in the Pull mode, the device agent module 420 of the client 410 requests the server 450 to send a content list for a specific medium through the device interface module 425 (S610). At this time, the client 410 transmits the 'Pull mode content list requesting packet' to the server 450.

The server agent module 465 ascertains whether it supports the service type, and whether the client 410 is a member of the authorized group. Then, the server agent module 465 creates a list by extracting content corresponding to the specific medium from the content currently in use, and transmits the created content list to the client 410 using the 'Pull mode content list packet' (S620).

The client 410 selects desired content from the received content list, and requests the server 450 to provide the selected content using the 'Pull mode content requesting packet' (S630).

The server 450 supplies the requested content to the client 410 after having ascertained whether it supports the service type and whether the client is an authorized client (S640). Next, the client 410 converts the supplied content into a format suitable for output, and displays it (S645). If the client 410 desires to terminate the Pull mode of service, it can transmit the 'Pull mode content termination packet' to the server 450 (S650).

Figure 7:
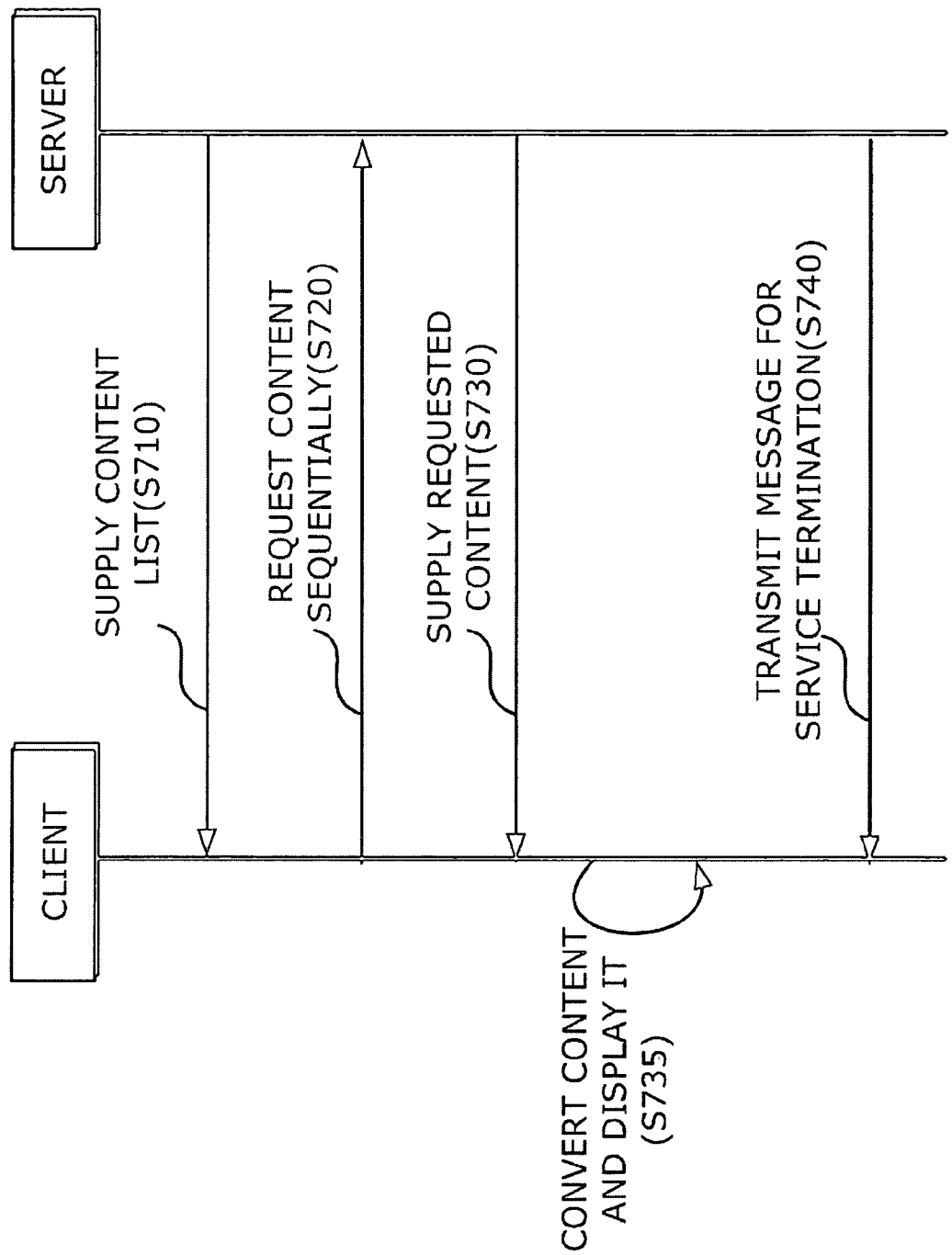
FIG. 7 illustrates a Push mode service performed according to an exemplary embodiment of the present invention.

FIG. 7 illustrates a Push mode of service according to an exemplary embodiment of the present invention. The Push mode of service can be used when a content is supplied to the client 410 from the server 450 according to an operation by the scheduling module 460.

Packets to perform the Push mode service have these payloads:

Packet payload for Push mode content list={Service Type, Server Name, Media Type, Content List Information, Server Service Networking Information};

Packet payload for requesting Push mode content={Service Type, Group Name, Client Name, Content Information}; and Packet payload for Push mode content termination={Service Type, Server Name, Media Type}.

As illustrated in FIG. 7, in the Push mode, the server 450 transmits a content list to the client 410 connected thereto (S710). At this time, the server 450 may use the 'Push mode content list packet'.

The client 410 requests the server 450 to transmit the content in the received content list sequentially, using the 'Push mode content requesting packet' (S720).

The server 450 supplies the requested content to the client 410 in step S730 after having ascertained whether the client is authorized and whether the service is supported. Then the client 410 converts the supplied content into a format suitable for output, and displays it (S735). Operations S720, S730 and S735 are repeated for all the content desired by the client 410.

When the server 450 desires to terminate the Push mode of service, it can transmit the 'Push mode content termination packet' to the client 410 (S740).

Figure 8:
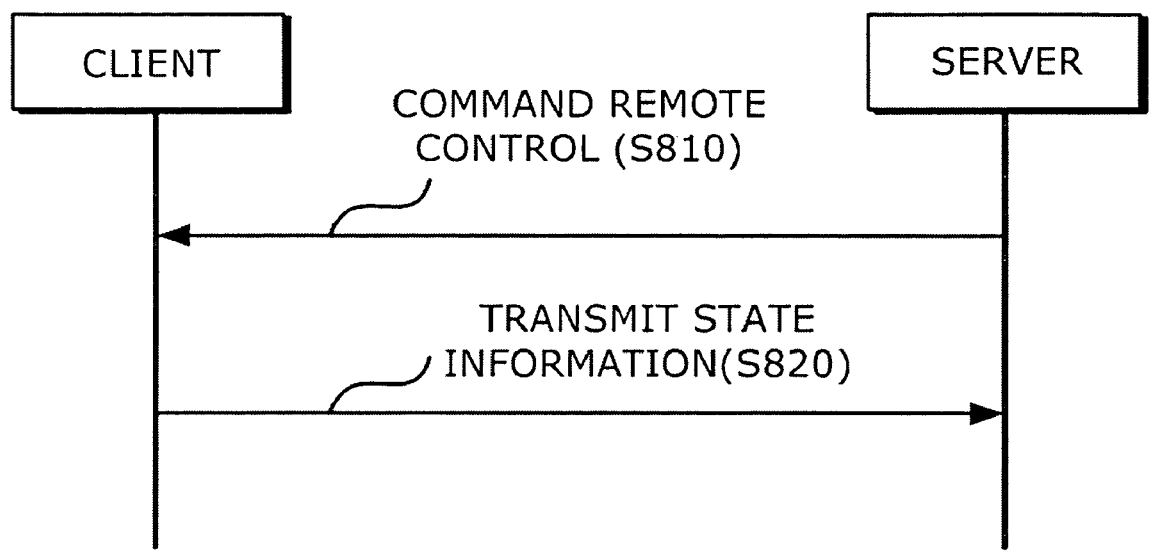
FIG. 8 illustrates performing a remote control service according to an exemplary embodiment of the present invention.

FIG. 8 illustrates a remote control service according to an exemplary embodiment of the present invention, which may be used when states of the client 410, such as a screen or sound mode, are remotely controlled, and the states of the client 410 are monitored by the server 450.

Packets for a remote control service can have these payloads:

Packet payload for remote control={Service Type, Server Name, Remote Control Command, Remote Control Command Parameter}; and Packet payload for client state information={Service Type, Server Name, Client State Information}.

'Remote control command' refers to a control command issued by the server 450. An example of a 'remote control command' is power on/off of the client 410, Wake Up LAN, controls of contrast, tint, brightness, volume, screen mode, or sound mode, and others. The 'Wake Up LAN' refers to turning on power of a CPU connected to a concerned network card by multicasting MAC address information of the network card to a network.

The 'remote control command parameter' refers to a parameter of the remote control command.

The 'client state information' give information about the state of the client 410, such as the volume, screen mode, sound mode, contrast, tint and brightness of the client 410.

As illustrated in FIG. 8, in the remote control service, the server 450 transmits a remote control command to the client 410 using a 'remote control packet' (S810).

The device agent module 420 of the client 410 interprets the packet received from the server 450. If it is ascertained that the packet is concerned with a command for remote control, the device agent module 420 transmits information regarding the received remote control command to the control and monitoring module 435. The control and monitoring module 435 conducts the corresponding command and reports any change in the state of the client 410 as a result to the device agent module 420. The device agent module 420 transmits the state change reported from the control and monitoring module 435 to the server 450 through the device interface module 425 (S820) using the 'client state information packet'.

Figure 9A:
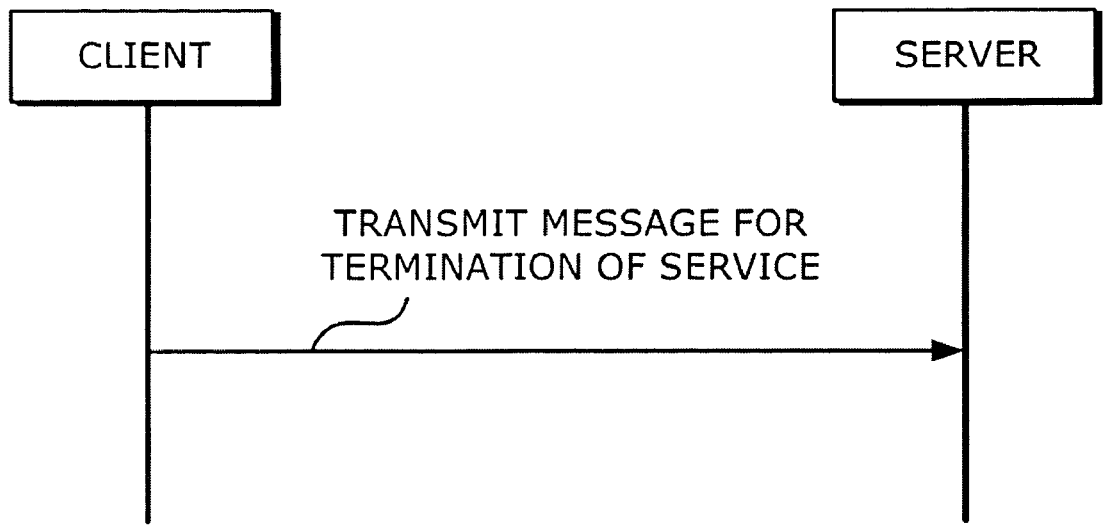
FIGS. 9A and 9B illustrate termination of the service according to an exemplary embodiment of the present invention.
Figure 9B:
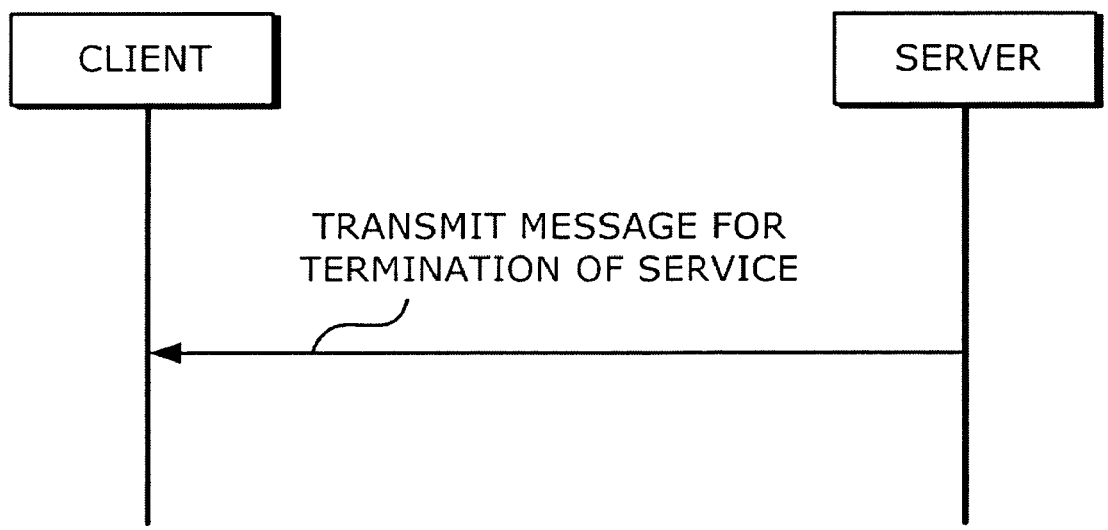

FIGS. 9A and 9B illustrate termination of service according to an exemplary embodiment of the present invention, wherein the server 410 or the client 450 may be used to inform its counterpart of termination of service.

Packets for service termination may have these payloads:

Packet payload for termination of client services={MAC Address, Service Type, Group Name, Client Name}; and Packet payload for termination of server services={Service Type, Server Name}.

FIG. 9A represents service termination by the client 410. At this time, the client 410 transmits the 'Packet for termination of client services' to the server 450.

FIG. 9B represents service termination by the server 450. At this time, the server 450 transmits the 'Packet for termination of server services' to the client 410. In this case, the service termination message is transmitted to all the clients connected to the server 450.

Also, a message to periodically ascertain whether the server 450 and the client 410 are connected is transmitted. Abnormal termination by a counterpart may be ascertained using this message. At this time, packets for confirming such a connection may have a payload containing a MAC Address, a Service Type, a Group Name, and a Client Name.

According to an exemplary embodiment of the present invention, a content displaying system may provide functions for a server to control a display apparatus, or for the server to monitor any changes in state of the display apparatus, in addition to a single server being able to transmit content to multiple display apparatuses and having it displayed thereon. That is, the display apparatus may perform not only a simple function to output content but also more various functions while conducting message communication with the server.

Figure 10:
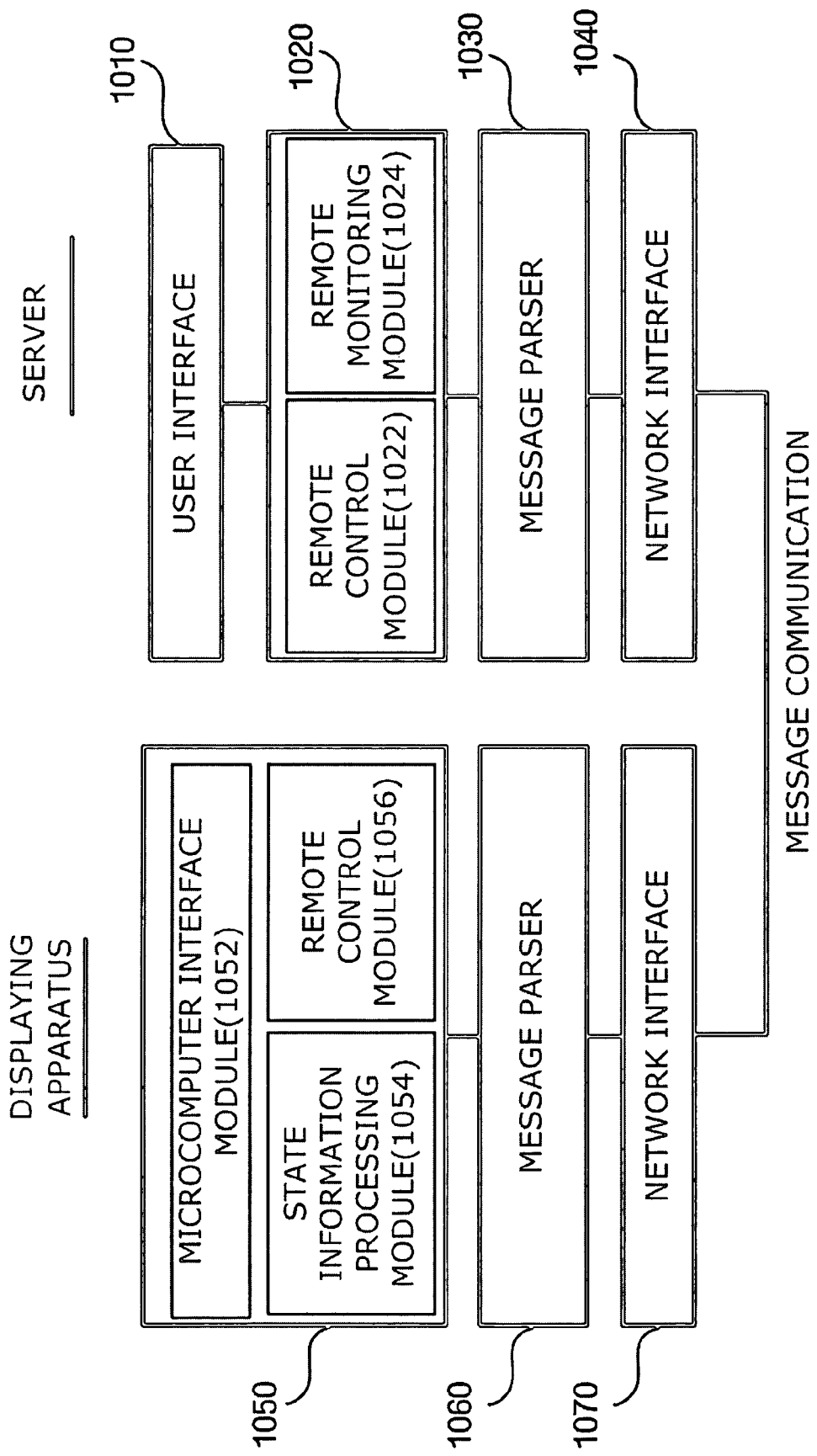
FIG. 10 is a block diagram illustrating remote control and monitoring services according to an exemplary embodiment of the present invention.

FIG. 10 is a block diagram illustrating remote control and monitoring according to an exemplary embodiment of the present invention.

To perform a remote control and monitoring function, the server 450 contains a user interface 1010, a server side remote control and monitoring module 1020 including a remote control module 1022 and a remote monitoring module 1024, a message parser 1030 and a network interface 1040.

The user interface 1010 is provided by the user interface module 475 depicted in FIG. 4, which provides an interface for a server manager to control the display apparatus 410 or to let the server manager know state information generated by the display apparatus 410.

The message parser 1030 creates a message for controlling a display apparatus 410, or interprets the message regarding the state information received from the display apparatus 410. The functions of the message parser 1040 may be conducted by the server agent module 465 depicted in FIG. 4.

The remote control module 1022 transmits control information received from the user interface 1010 to the message parser 1030, and the remote monitoring module 1024 transmits state information of the display apparatus interpreted by the message parser 1030 to the user interface 1010.

The remote control module 1022 and the remote monitoring module 1024 may reside in the server agent module 465 or the user interface module 475.

The server side network interface 1040 may be implemented by the server interface module 455 depicted in FIG. 4.

The display apparatus 410 contains a client side control and monitoring module 1050 including a microcomputer interface module 1052, a state information processing module 1054 and a remote control module 1056, a message parser 1060 and a network interface 1070.

The client side network interface 1070 may be implemented by the device interface module 425 depicted in FIG. 4.

The message parser 1060 creates a message containing state information of the display apparatus 410 or information on an event generated, or it interprets the control message received from the server 450. The functions of the message parser 1060 may be performed by the device agent module 420 depicted in FIG. 4.

The remote control module 1056 transmits the control information interpreted by the message parser 1060 to the microcomputer interface module 1052, and the state information processing module 1054 senses an event generated by the display apparatus 410 and state changes in the display apparatus 410 and transmits them to the message parser 1060.

The microcomputer interface module 1052 is a module to control hardware elements of the display apparatus 410; it receives control information from the remote control module 1056.

The remote control interface 1056, the state information processing module 1056, and a microcomputer interface module 1052 may be part of the control and monitoring module 435 depicted in FIG. 4.

Remote Control of the Displaying Apparatus by the Server Manager

When the server manager intends to turn the power of a specific display apparatus 410 off, the server manager ascertains the power state of each display apparatus through the user interface 1010 provided by the user interface module 475.

Then, when the server manager selects the display apparatus 410 that he/she wishes to turn off, the remote control module 1022 receives this selection and transmits it to the image parser 1030. The message parser 1030 creates a message for remote control and transmits it to the display apparatus 410 through the server side network interface 1040.

The display apparatus 410 receives the message through the network interface 1070, and the message parser 1060 interprets the received message and transmits the interpreted message to the remote control module 1056. Operations to turn the power on or off relate to hardware elements, and thus, the remote control module 1056 drives the microcomputer interface module 1052 to turn on or off the power of the display apparatus 410.

The volume, contrast, and brightness of each display apparatus may be adjusted as in the above-described method.

Monitoring Changes in State of the Displaying Apparatus

State information of the display apparatus 410 includes state changes caused by remote control of the display apparatus 410 and state changes caused by internal operations in the display apparatus 410. In the former case, when changes occur in the power state (as described above), the state information processing module 1054 senses it and transmits it to the message parser 1060. The message parser 1060 creates a message to indicate the state and transmits it to the server 450 through the network interface 1070.

The server 450 receives the message through the network interface 1040, and the message parser 1030 interprets the received massage and transmits the interpreted information to the remote monitoring module 1020. The remote monitoring module 1020 supplies information on the state change to the server manager through the user interface 1010.

With respect to state changes caused by internal operations in the display apparatus 410, the server 450 may receive state information at regular intervals from all the display apparatuses connected to a network. This state information includes a list of display apparatuses connected to the server 450, the network connection state of the server 450, and service states of each display apparatus. In addition, the same picture that is displayed on the display apparatus can be displayed on the screen of the server 450. Further, the server 450 may perform a control operation to automatically cope with main events generated in the display apparatus.

According to exemplary embodiments of the present invention, content may be more efficiently supplied to multiple display apparatuses by means of a single server, and a content displaying system may supply a user with various functions, in addition to displaying the content, by defining a method for message communication between the server and the display apparatuses.

It will be understood by those of ordinary skill in the art that various replacements, modifications and changes in form and details may be made therein without departing from the spirit and scope of the present invention as defined by the following claims. Therefore, it is to be appreciated that the above description of exemplary embodiments is for purposes of illustration only and is not to be construed as a limitation of the invention.

What is claimed is:

1. A system for displaying content on multiple display apparatuses using message communication, the system comprising:
    a server configured to store content therein; and
    a plurality of display apparatuses, each of the plurality of display apparatuses comprising:
        a device interface module configured to receive a message to display content, receive a list of content, to receive content, and receive a message to perform an operation to control the respective display apparatus from the server;
        a device agent module configured to create a message requesting content included in the list of content received from the server, where the device interface module has received the message containing the content list, and to transmit the message requesting content to the server through the device interface module, the device agent module configured to receive the requested content from the server through the device interface module;
        a content processing module configured to convert the received content into a suitable output format;
        a display module configured to receive the converted content from the content processing module and output the converted content; and
        a control and monitoring module configured to provide state information of the respective display apparatus to the server and to perform the operation to control the respective display apparatus,
    wherein the server is configured to manage the plurality of display apparatuses as a classified group,
    wherein the server transmits the requested content by scheduling,
    wherein at least one of the device interface module, the device agent module, and the content processing module, is a hardware module, and
    wherein when the display apparatus receives a message from the server through the device interface module, the device agent module determines whether the received message relates to content output or to control of the display apparatus, and when the received message relates to content output, the device agent module transmits the received message to the content processing module.

2. The system of claim 1, wherein the message containing the content list comprises information on service type, server name, media type, content list, and server service network.

3. The system of claim 1, wherein the content requesting message comprises information on service type, name of group to which the display apparatus belongs, name of the display apparatus, and content requested.

4. The system of claim 1, wherein the operation to control the respective display apparatus is at least one of a command to control a power state, a command to control playback operation of a current content output, a command to control a visual setting, and a command to control an audio setting of the respective display apparatus.

5. A method for displaying content on multiple display apparatuses using message communication, the method comprising:
    at a display apparatus managed as a classified group by a server, receiving a message from the server storing content therein, the received message comprising at least one of a list of the content stored in the server, and an operation to control the display apparatus;
    at the display apparatus, creating a message to request content included in the list of the content and transmitting the content request message to the server;
    at the display apparatus, receiving the requested content from the server;
    at the display apparatus, converting the received content into a suitable output forma; and
    at the display apparatus, providing state information of the display apparatus to the server and performing the operation to control the display apparatus,
    wherein the server transmits the requested content by scheduling, and
    wherein when the display apparatus receives a message from the server, the display apparatus determines whether the received message relates to content output or to control of the display apparatus, and when the received message relates to content output, the display apparatus transmits the received message to a content processing module.

6. The method of claim 5 wherein the message containing the list of the content comprises information on service type, server name, media type, content list, and server service network.

7. The method of claim 5, wherein the content request message comprises information on service type, name of group to which the display apparatus belongs, name of the display apparatus, and content requested.

8. The method of claim 5, wherein the operation to control the display apparatus is at least one of a command to control a power state, a command to control playback operation of a current content output, a command to control a visual setting, and a command to control an audio setting of the display apparatus.

9. An apparatus for displaying content, the apparatus comprising:

a device interface module configured to receive a message to display or receive content from a server storing content therein, receive a message to perform an operation to control the display apparatus, and manage the display apparatus as a classified group;

a device agent module configured to create a first message requesting content included in a list of content received from the server, where the device interface module has received a second message containing the content list, to transmit the first message to the server through the device interface module, and to receive the requested content from the server through the device interface module;

a content processing module configured to convert the received content into a suitable output format;

a display module configured to receive the converted content from the content processing module and output the converted content; and a control and monitoring module configured to provide state information of the display apparatus to the server and to perform the operation to control the display apparatus, wherein the requested content is transmitted by scheduling, wherein at least one of the device interface module, the device agent module, and the content processing module, is a hardware module, and wherein when the display apparatus receives a message from the server through the device interface module, the device agent module determines whether the received message relates to content output or to control of the display apparatus, and when the received message relates to content output, the device agent module transmits the received message to the content processing module.

10. The apparatus of claim 9, wherein the message containing the content list comprises information on service type, server name, media type, content list, and server service network.

11. The apparatus of claim 9, wherein the content requesting message comprises information on service type, name of group to which the display apparatus belongs, name of the display apparatus, and content requested.

12. The apparatus of claim 9, wherein the operation to control the display apparatus is at least one of a command to control a power state, a command to control playback operation of a current content output, a command to control a visual setting, and a command to control an audio setting of the display apparatus.

13. A server for displaying content on multiple display apparatuses, the server comprising:

a storage module configured to store content therein;

a server agent module which creates a message containing information on a list of content stored in the server and a control operation to manage a display apparatus as a classified group;

a server interface module which transmits the message to the display apparatus, and receives a request for content message from the display apparatus, wherein the server receives status information of the display apparatus and provides the control operation, wherein the server agent module is configured to extract the content requested by the display apparatus from the storage module, and to transmit the extracted content to the display apparatus through the server interface module, wherein the server transmits the extracted content by scheduling, wherein the transmitted content is converted into a suitable output format by the display apparatus, wherein at least one of the storage module, the server agent module, and the server interface module, is a hardware module, wherein when the display apparatus receives a message from the server through a device interface module, a device agent module determines whether the received message relates to content output or to control of the display apparatus, and when the received message relates to content output, the device agent module transmits the received message to a content processing module.

14. The server of claim 13, wherein the message containing the content list comprises information on service type, server name, media type, content list, and server service network.

15. The server of claim 13, wherein the request of the display apparatus is a message comprising information on service type, name of group to which the display apparatus belongs, name of the display apparatus, and content requested.

16. The server of claim 13, wherein the control operation is at least one of a command to control a visual setting, and a command to control an audio setting of the display apparatus.

* * * * *